United States Patent [19]

Kostreski

[11] Patent Number: 5,534,912
[45] Date of Patent: Jul. 9, 1996

[54] EXTENDED RANGE VIDEO ON DEMAND DISTRIBUTION SYSTEM

[75] Inventor: Bruce W. Kostreski, Wheaton, Md.

[73] Assignee: Bell Atlantic Network Services, Inc., Arlington, Va.

[21] Appl. No.: 233,579

[22] Filed: Apr. 26, 1994

[51] Int. Cl.$^6$ .................................................. H04N 7/16
[52] U.S. Cl. ................................ 348/6; 348/7; 348/12; 455/4.2
[58] Field of Search ............................ 348/6, 7, 12, 13, 348/10, 11; 455/4.2, 5.1, 6.1; 370/69.1, 73; H04N 7/16, 7/173

[56] References Cited

U.S. PATENT DOCUMENTS

| | | |
|---|---|---|
| 3,992,589 | 11/1976 | Kuegler . |
| 3,997,736 | 12/1976 | Gorman, II . |
| 4,367,548 | 1/1983 | Cotten, Jr. et al. . |
| 4,441,180 | 4/1984 | Schussler . |
| 4,450,481 | 5/1984 | Dickinson . |
| 4,475,123 | 10/1984 | Dumbauld et al. . |
| 4,484,218 | 11/1984 | Boland et al. . |
| 4,506,387 | 3/1985 | Walter . |
| 4,530,008 | 7/1985 | McVoy . |
| 4,553,161 | 11/1985 | Citta . |
| 4,574,305 | 3/1986 | Campbell et al. . |
| 4,616,256 | 10/1986 | Boutmy . |
| 4,654,866 | 3/1987 | Bottle et al. . |
| 4,709,418 | 11/1987 | Fox et al. . |
| 4,760,442 | 7/1988 | O'Connell et al. . |
| 4,891,694 | 1/1990 | Way . |
| 5,010,399 | 4/1991 | Goodman et al. . |
| 5,150,247 | 9/1992 | Sharpe et al. . |
| 5,150,365 | 9/1992 | Hirata et al. . |
| 5,157,715 | 10/1992 | Fischer et al. . |
| 5,189,673 | 2/1993 | Burton et al. . |
| 5,206,722 | 4/1993 | Kwan .................................... 348/7 |
| 5,247,347 | 9/1993 | Litteral et al. . |
| 5,341,474 | 8/1994 | Gelman et al. ............................. 348/7 |
| 5,408,260 | 4/1995 | Arnon ....................................... 348/6 |
| 5,410,343 | 4/1995 | Coddington et al. ....................... 348/7 |

OTHER PUBLICATIONS

Joe Sutherland, "Residential Video Services", Jul. 1992 pp. 36–41.
Stephen Fleming, "ADSL: The On–ramp to the information highway", Jul. 12, 1993 pp. 20–26.
Yee–Hsiang Chang, "An Open–systems Approach to Video On Demand", May 1994. p. 72.
Robert W. Lawrence, "Switched Simplex High bit Rate Services in Today's Residential Environment" 1992.

*Primary Examiner*—James J. Groody
*Assistant Examiner*—Chris Grant
*Attorney, Agent, or Firm*—Lowe, Price, LeBlanc & Becker

[57] ABSTRACT

In a video on demand system utilizing asymmetric digital subscriber line (ADSL) interfaces, a plurality of video channels are arranged at a central office into ADSL format and, together with a provisioning channel, are multiplexed into a composite spectrum. This composite spectrum is then transmitted to an intermediate distribution point, remote from the central office, over analog optical fiber. The composite spectrum is split and applied individually to channel selection mixers associated with the subscribers serviced by the intermediate distribution point. Telephone signals (POTS) are combined at the intermediate distribution point into the ADSL signal and transmitted with the video, to an ADSL multiplexer/demultiplexer at the subscriber's location. In the reverse direction, channel direction/change signals are split from the composite received from the subscriber's location at the intermediate distribution point and utilized to control channel selection. Program request information is forwarded back over the optical fiber link to the central office where it is extracted at the ADSL individual channel units for use in providing video on demand service.

40 Claims, 6 Drawing Sheets

EXTENDED RANGE VIDEO ON DEMAND DISTRIBUTION SYSTEM

TECHNICAL FIELD

The invention relates to the distribution of video information over existing telephone wiring plant facilities and to a fiber optic extension of a network which delivers television programming to subscribers using Asymmetric Digital Subscriber Line (ADSL) Interfaces.

BACKGROUND ART

Distribution of full motion video data has evolved from early television broadcasting to meet viewer demand. Earliest video distribution was by point-to-point wiring between a camera and a video monitor. This was followed by scheduled television broadcasting of programming over the public air waves. In the 1960s, Community Antenna Television (CATV) was chartered to provide off-air television signals to viewers in broadcast reception fringe areas. Later, under FCC regulation, the CATV industry was required to provide local access and original programming in addition to off-air broadcast signal distribution.

In response, several sources of cable network programming were established. Because of the wide bandwidth available on cable television systems, additional channels were made available for the new programming. However, programming was generally prescheduled, with the viewer left to tune to the designated channel at the appointed time to view a particular program.

To increase revenues, cable television systems have initiated distribution of premium channels viewable only by subscribers having appropriate descramblers. The descramblers are tuned to receive only premium channels, descramble the video and audio information and supply a signal capable of reception on a standard television set.

Pay-per-view programs, which evolved later, include recently released movies, live concerts and popular sporting events. Subscribers wishing to view a pay-per-view program place an order with the cable operator. At the designated time, the subscriber's descrambler is activated to permit viewing of the pay-per-view programming. However, the subscriber is restricted to viewing the programming at the scheduled time. There is no capability of delivering programming to a subscriber on demand, that is, immediately or at a subscriber-specified time and date.

In the early 1980s, technological advances resulted in the proliferation of Video Cassette Recorders (VCR), establishing a second course for video programming distribution. Pre-recorded video programs are now available for sale and rental to VCR owners. Using a VCR, the viewer selects from among many titles available for sale and rental, and views the program when convenient. The VCR owner further has the capability to selectively view the programming using special functions of the VCR, such as pause, fast forward, reverse, slow motion, etc. The viewer can thus manipulate and replay portions of the program at will.

The penalty for this convenience, however, is in the necessity to travel to the local video rental/sales store, if necessary wait for a popular video program tape to become available, once the program is obtained return home to view it and then revisit the video store to return the tape.

Telephone lines have been suggested as an alternative means of video distribution. However, systems using the public switched telephone network (PSTN) are often bandwidth limited, providing generally only still frame or video conferencing capabilities. Because telephone system carriers for the most part use the PSTN only for connectivity between subscribers, there is no capability for dynamic routing of digitized video without dedicated leased, wide bandwidth circuits. Telephone line based systems also fail to provide acceptable VCR type functional control of the programming.

U.S. Pat. No. 5,247,347 to Litteral et al., the disclosure of which is hereby incorporated in its entirety into this disclosure by reference and over which the present invention is an improvement, discloses an enhanced public switched telephone network which also provides a video on demand service to subscribers over the PSTN. A menu of video programming information is accessible at the subscriber's premises. The subscriber may transmit ordering information via the PSTN to the independent video information providers. Video programming may be accessed and transmitted to the subscriber directly from a video information provider (VIP) or through a video buffer located at a central office (CO) serving the subscriber.

The VIP transmits coded digital video data over wideband PSTN supplied connectivity to a central office. The video data may be buffered at the central office for transmission over a POTS line to the subscriber. A subscriber may use either a standard telephone instrument over the PSTN or a dedicated control device over an ISDN or X.25 packet network to order the video programming. Such a device is located at a television set of the subscriber and permits a display of the program menu on the television screen.

Connectivity between the central office and the subscriber for transmission of video data is provided by an asymmetrical digital subscriber line (ADSL) system. ADSL interface units perform multiplexing of digital video information with voice information to be transmitted to the subscriber and support transmission on the packet data network of one or more reverse control channels from the subscriber to the central office.

Figure 1:
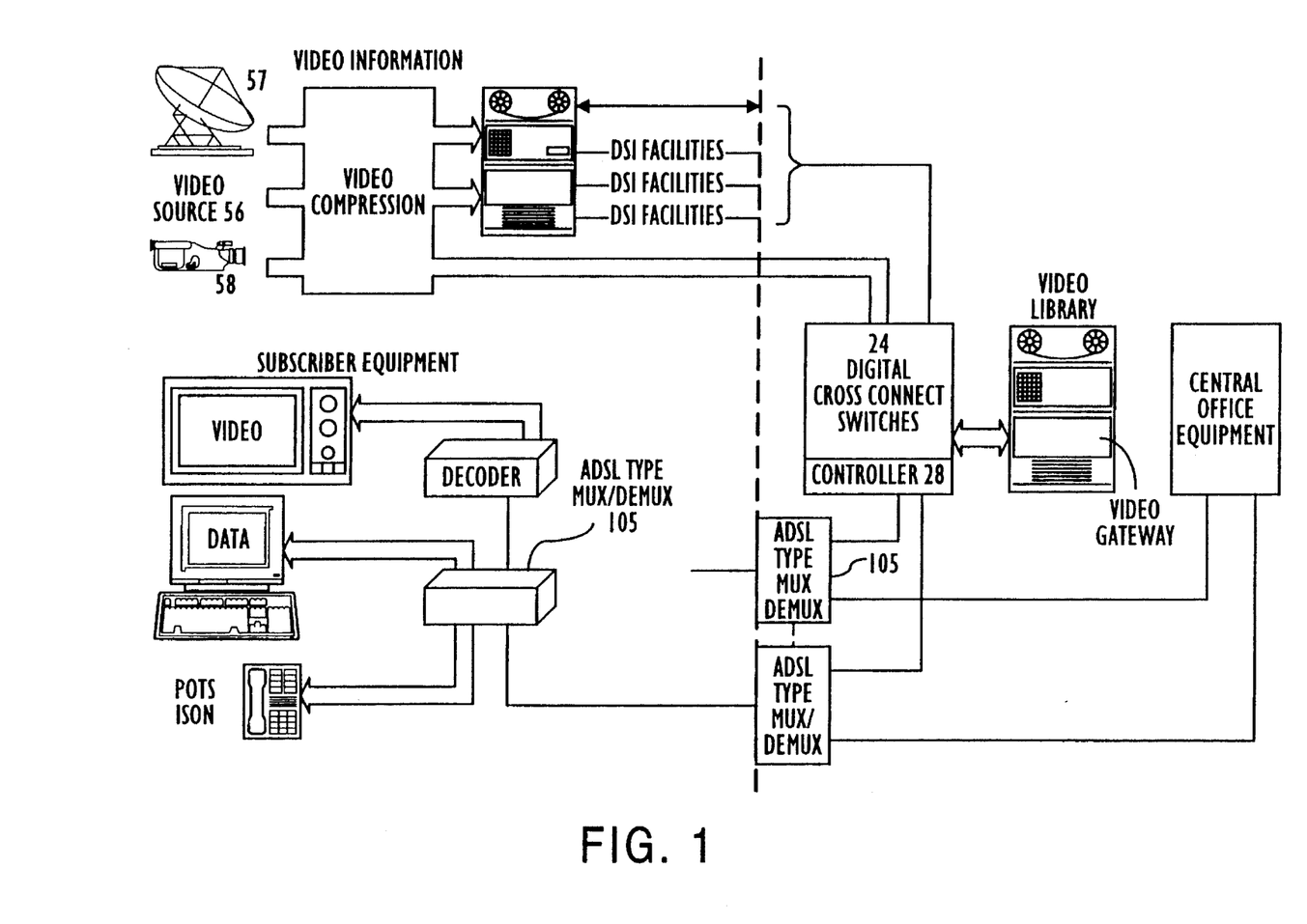
FIG. 1 is a generalized system diagram showing video data flow from a video information source to a subscriber in a prior art system.

FIG. 1 depicts a prior art video on demand system, transmitting compressed, digitized video data of the type disclosed by the Litteral et al. Patent. The video on demand system shown in FIG. 1 utilizes the existing Public Switched Telephone Network (PSTN) and implements compression techniques for storing and transmitting video information. The switching facilities are located in central offices (COs) 100 serving residential customers or subscribers. Electronic devices such as ADSL interfaces 105 associated with the subscriber loops modify the transmission characteristics of the subscriber loops to permit delivery of full motion video information over existing telephone wiring (subscriber loop) plant facilities.

In the Litteral Patent, the ADSL interface units are located at the central office and at the subscriber's location. As disclosed in the Litteral Patent, the ADSL interface units combine video information together with bidirectional signalling and a plain old telephone service (POTS) for transmission over an ordinary telephone wiring plant.

Certain problems arise with the prior art type ADSL transmission systems. When environmental interference situations arise, ADSL transmission is more sensitive than POTS. As transmission distances over copper wire pairs exceed 18,000 feet, the ADSL of the prior art becomes marginal or infeasible. If the copper plant has loading coils, repeaters, or bridge taps, or experiences corrosion or moisture, ADSL operation may be infeasible. In the event the copper facilities available between the central office and the subscriber's premises are not continuous (e.g. at least a portion of the loop runs on a subscriber loop carrier system), ADSL operation will generally not be feasible.

The system of the present invention solves these problems and provides an number of other advantages over earlier ADSL systems.

SUMMARY OF THE INVENTION

The invention is directed to a video on demand distribution system which overcomes the problems of the prior art.

The invention accomplishes this by multiplexing a plurality of individual channels of video programming in ADSL or ADSL-like format into a composite spectrum (without the POTS) which spectrum is transmitted over optical fiber or other broadband media to an intermediate distribution point where a selected video channel is combined with telephone signals from the copper wiring plant for transmission to the subscriber.

In accordance with the invention, a subscriber may select any channel from the combined spectrum carried on the downstream fiber by selecting a local oscillator frequency to input to a mixer assigned to the subscriber. The available downstream video channels may include CATV channels and video on demand channels dedicated to or dynamically assignable to individual subscribers.

Accordingly, one advantage of the invention is in extending the range and improve signal quality of a video on demand distribution system which uses ADSL or ADSL type interface units.

Another advantage of the invention is in permitting ADSL interface units to be used with carrier equipped telephone wiring plants.

Another advantage is in adapting or modifying an existing telephone wiring plant to accommodate distribution of video information Still another advantage of the invention is in providing user controlled channel selection at a site remote from both the central office and subscriber premises.

Other advantages of the invention are (1) achieving higher bandwidth, (2) over an extended range, and (3) lower system costs by reducing the number of CO based ADSL units from one per subscriber to one per program channel.

These and other advantages of the invention are achieved as shown in the following drawings.

BEST MODE FOR CARRYING OUT THE INVENTION

Figure 2:
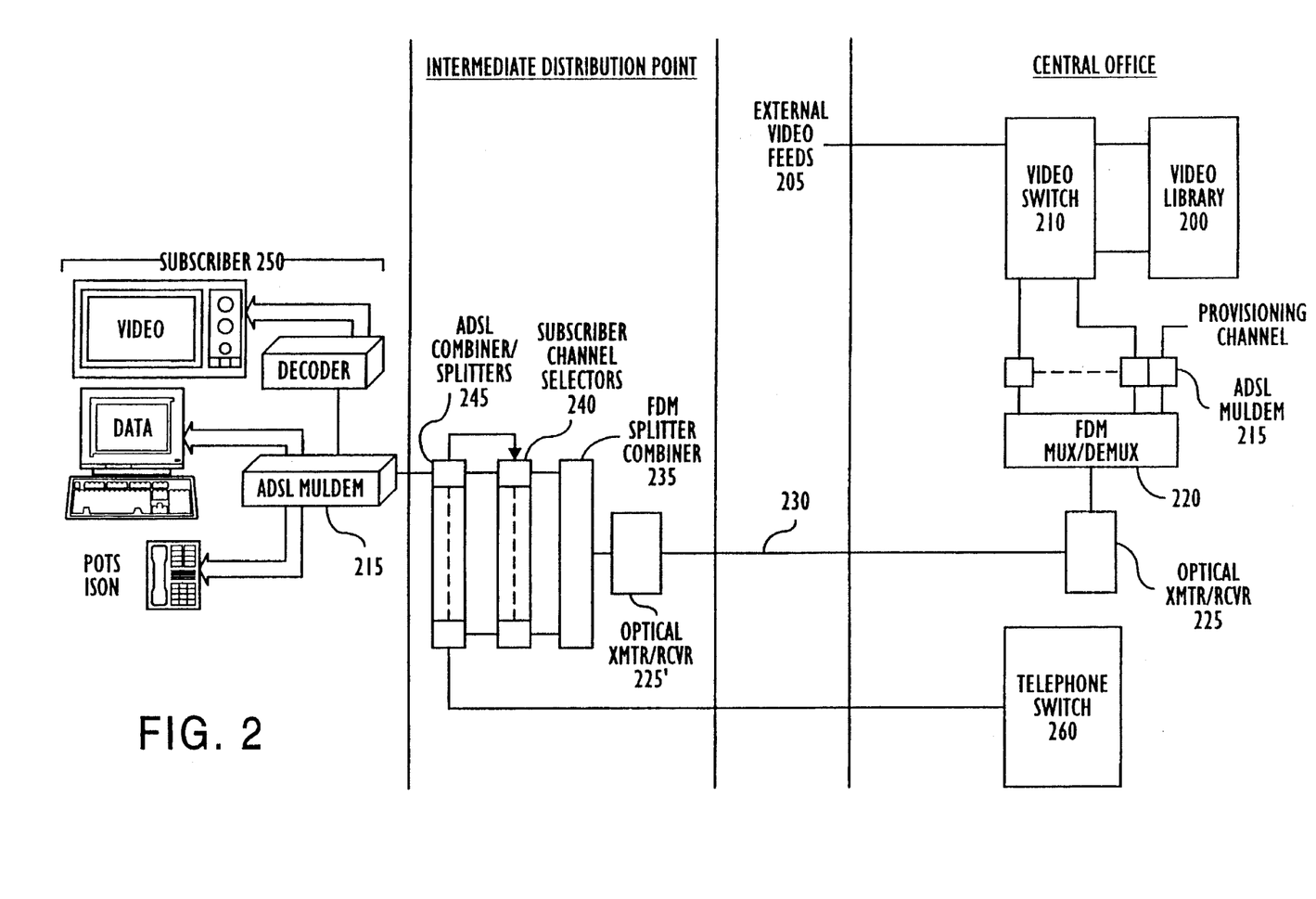
FIG. 2 is a block diagram of a system according to the invention.

As shown in FIG. 2, switched video programming provided by video library 200 or external video feeds 205 (e.g. switched DS-2 video sources, satellite or live feeds) is provided at the output of video switch 210. Preferably the video signals are MPEG encoded and compressed.

Figure 3:
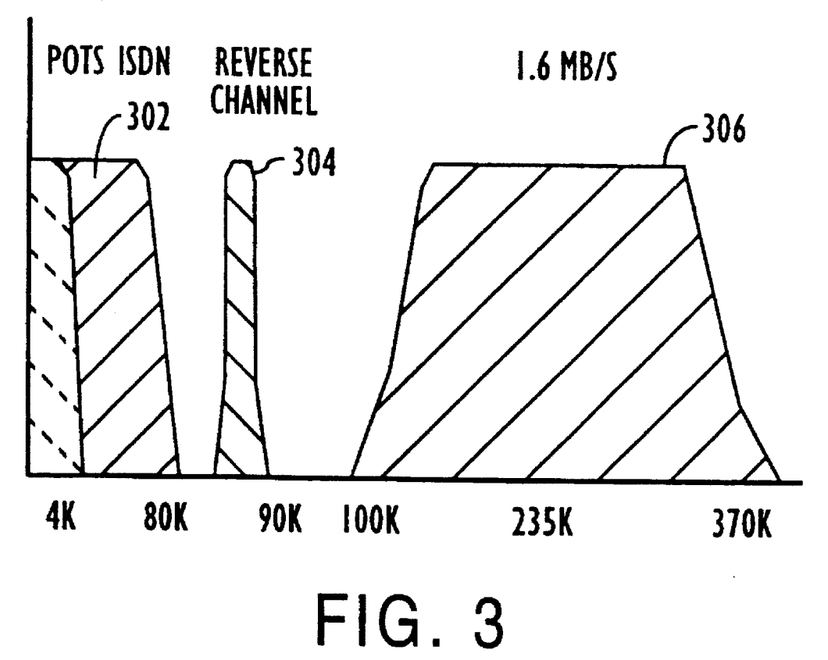
FIG. 3 illustrates the multiplexed spectrum output of a typical ADSL interface unit.

ADSL multiplexer/demultiplexers (muldems) 215 translate the incoming video programming into the ADSL signal format, illustrated in FIG. 3. ADSL muldems transmit standard telephone baseband signalling and voice traffic together with a one-way wideband (1.5 to 6 MB/s) information channel, a two-way narrowband (9.6 to 16 KB/s) signalling channel and a two-way narrowband (8 KB/s) embedded operations channel (EOC).

The outputs from the muldems 215 are translated into respective frequency slots of a frequency division multiplexed (FDM) composite spectrum by FDM multiplexer/demultiplexer 220. FDM multiplexer/demultiplexers are well known in the art. The FDM output signal from 220 drives an optical transmitter portion of optical transmitter/receiver 225 and the optical output is transmitted over an analog optical fiber 230 to optical transmitter/receiver 225' located at an intermediate distribution point remote from the central office.

At the remote distribution point, optical transmitter/receiver 225' converts the optical signal from the optical fiber to an electrical composite FDM signal.

Splitter/combiner 235 provides a duplicate copy of the composite FDM signal for each subscriber serviced at the intermediate distribution point. Signal splitters/combiners of this nature are well known in the art.

In the downstream direction, channel selector 240 shifts the frequency of the composite FDM signal so that the desired selected channel from the composite spectrum is shifted into the passband of the ADSL combiner/splitter 245 for transmission to the individual subscriber 250.

The ADSL combiner/splitter 245 is a network of circuit components (e.g. filter/combiner network) for merging the POTS signal into its position within the ADSL spectrum in the downstream direction for transmission to the subscriber over subscriber wiring. In the upstream direction, the ADSL combiner/splitter 245 splits the POTS and certain signalling information off from the ADSL composite spectrum.

In the upstream direction, channel selector 240 shifts the individual upstream ADSL channels into position in the composite FDM multiplexed spectrum for transmission over analog fiber 230 to the central office. In this upstream direction, the telephone signals are split off from the ADSL formatted signal by the ADSL combiner/splitter 245 and sent to the POTS switch 260 at the central office over existing telephone wiring plant. In addition, channel selection information is provided to the channel selector 240 from the ADSL combiner/splitter.

Figure 4:
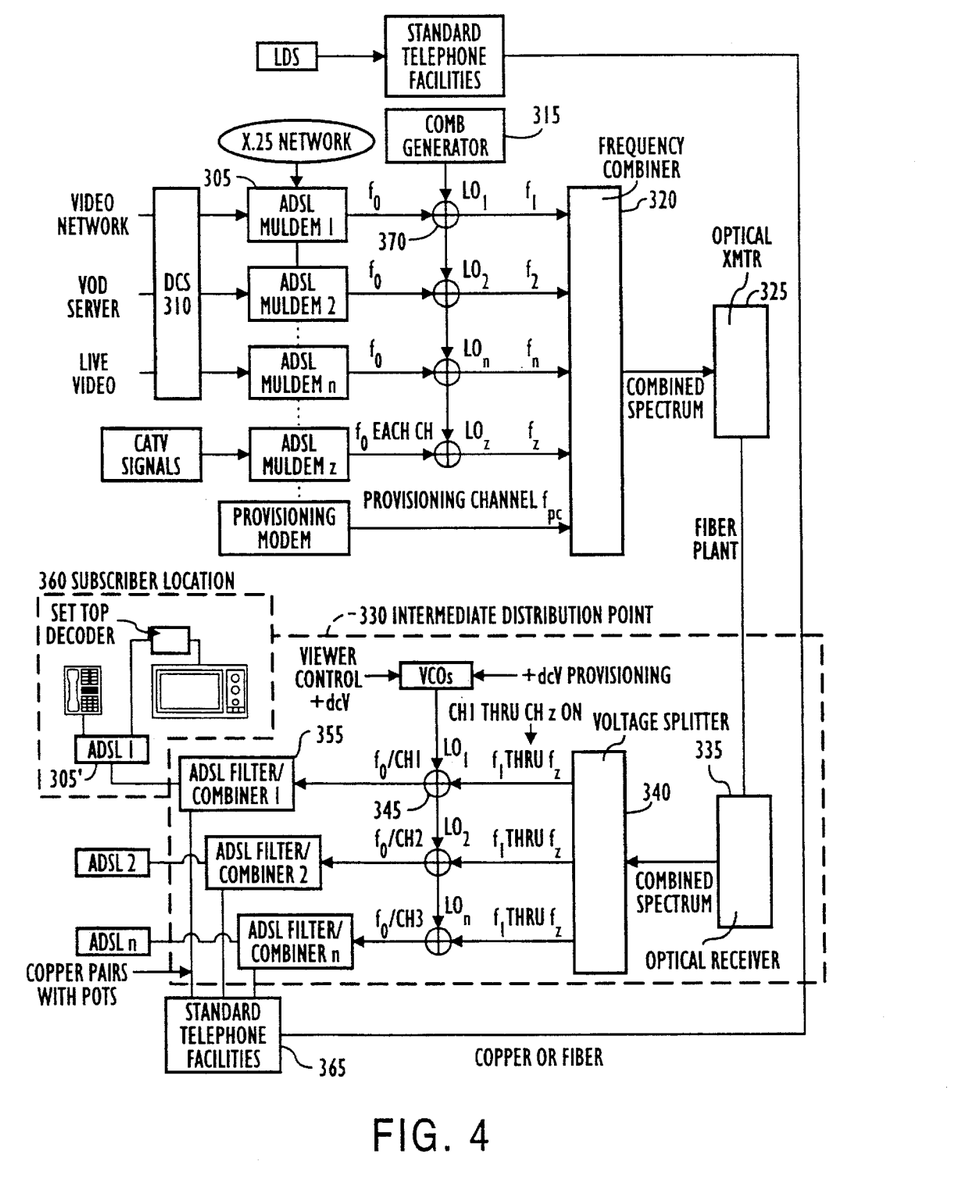
FIG. 4 illustrates a network configuration of the invention showing downstream information flow.

Considering the invention in more detail, as shown in FIG. 4, in the forward (downstream) direction wideband information channels representing video programs may be input to ADSL muldems 305 from either a digital cross connect switch 310 connected to one or more of (1) a VOD server, (2) a video network, (3) a CATV headend interface, (4) a live video source, or (5) a communication port (e.g., satellite feed). Preferably, the video signals are MPEG encoded and compressed.

Next, the output of each muldem is mixed with a different Local Oscillator ($LO_i$) frequency output from a Comb Generator 315 (static multifrequency output device). This mixing operation selectively frequency shifts each modulated digital channel from one of the muldems to a different one of the downstream frequency channels $f_1$ through $f_z$. As an alternative to the frequency shifting operations in the central office shown in FIG. 4, each ADSL unit at the central office could be designed to modulate the video signal onto a different frequency $f_1$ through $f_z$.

All of the channels represented by $f_1$ through $f_z$ and a provisioning channel $f_{pc}$ are then frequency multiplexed by a frequency combiner 320, and the combined spectrum ($f_1$ through $f_z$ and $f_{pc}$) from the combiner modulates an analog laser 325.

The FDM modulated light signals from the laser are optically transmitted over the downstream fiber to an intermediate distribution point 330. An optical receiver 335 at the distribution point receives the optical signals over the downstream fiber and converts those signals to electrical signals. The electrical signals representing the combined spectrum are split and amplified as necessary in voltage splitters 340 so that the combined spectrum will appear at each mixer 345. A local oscillator frequency $LO_i$ is also input to each mixer which translates one of the channels on $f_1$ through $f_z$ back to $f_o$.

In the Litteral patent, each subscriber has access to only the one video channel provided at the central office to the subscribers ADSL unit. However, in accordance with this invention, all subscribers serviced by a remote distribution point may individually select any channel for which they are authorized from the combined spectrum carried on the downstream fiber by selecting the proper local oscillator frequency $LO_i$ at the Intermediate Distribution Point 330 to input to the mixer assigned to the subscriber. An economy of delivery is achieved since more than one subscriber may share the same program delivered to the intermediate distribution point. The available downstream video channels may include CATV channels and video on demand channels that may be dedicated to or dynamically assignable to individual subscribers.

The local oscillator frequency is generated by a Voltage Controlled Oscillator (VCO) 350 which in turn is controlled by combined control voltages coming from both the network and the viewer (see FIG. 6 and the discussion hereinafter).

The spectrum of the output of the mixer, centered on $f_o$, contains the chosen program channel.

In the downstream direction, the ADSL filter combiner/ splitter unit 355 merges the telephone channel with the selected video channel into the ADSL spectrum and filters out the non-selected video channels.

Telephone signals arrive at the ADSL filter combiner/ splitter unit from a telephone switch in the central office via a separate path over standard telephone facilities. Unlike the prior art ADSL based video on demand systems, video and telephone signals follow separate paths until they are combined at the intermediate distribution point.

The ADSL filter combiner unit 355 contains telephone, signalling, embedded operations channels (EOC), and video transmissions, as in prior art ADSL systems. See FIG. 3. The output is coupled onto a copper twisted wire pair and transmitted to the subscriber's location 360 for reception by the ADSL remote unit 305' located there. The remote ADSL unit receives and demultiplexes the various telephone, video, embedded operations channel (EOC) and control signals for use as required.

Figure 5:
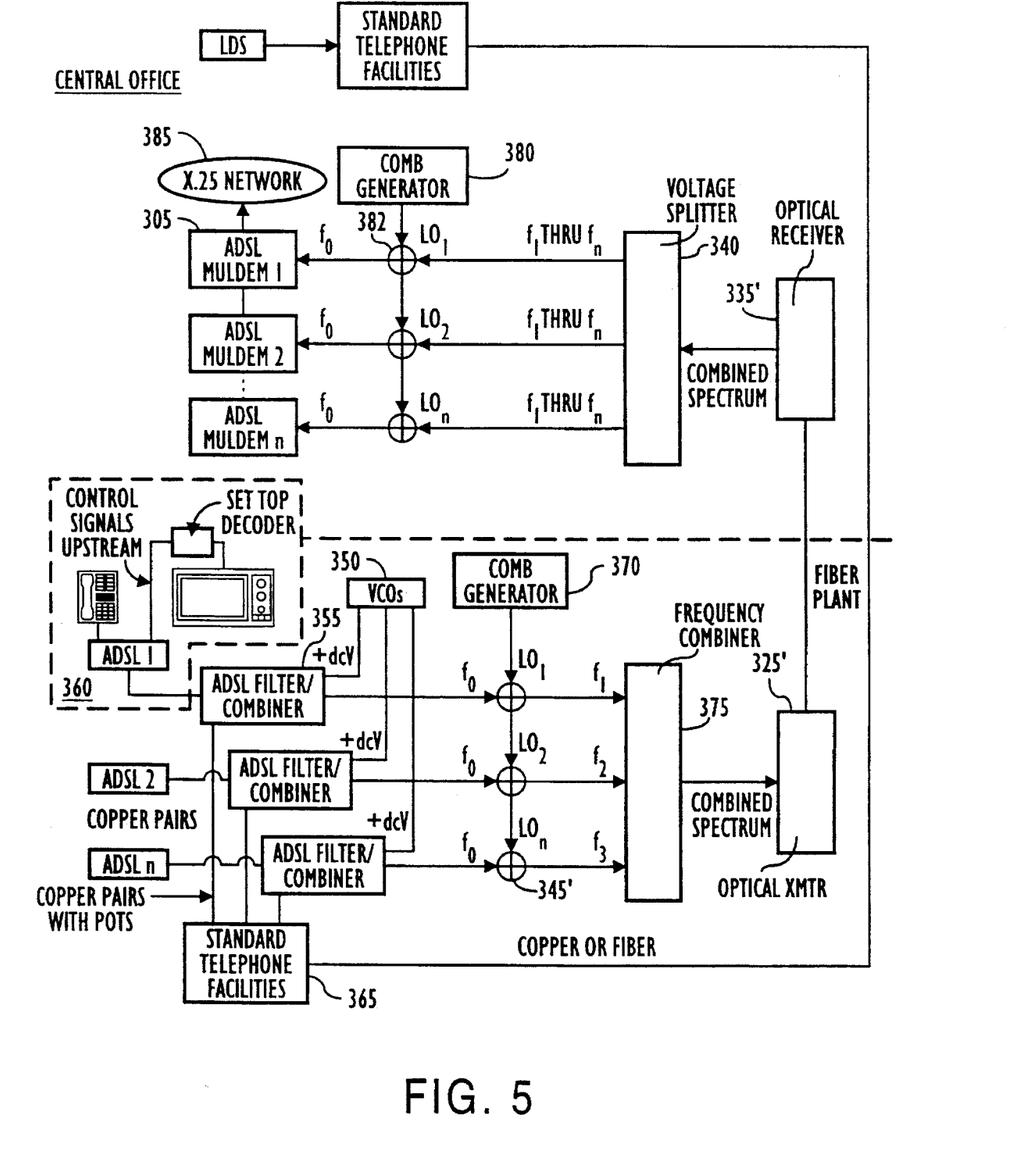
FIG. 5 illustrates a network configuration of the invention showing upstream information flow.

Considering the upstream direction of transmission in more detail in conjunction with FIG. 5, the ADSL unit 305' at each subscriber's premises frequency multiplexes the usual complement of ADSL signals (e.g. baseband telephone signals, time division multiplexed modulated narrowband signalling and embedded operations channel (EOC) signals) together and sends the resultant combined signal upstream to the ADSL filter combiner/splitter unit 355 via the twisted wire pair. The ADSL filter combiner/splitter unit demultiplexes the various upstream signals.

The ADSL filter combiner/splitter unit supplies telephone signals to standard telephone facilities 365, and the channel change signals are converted and applied to the VCO as a dc control voltage. The ADSL filter combiner/splitter unit supplies the time division multiplexed/modulated narrowband signalling channel and the embedded operations channel (EOC) signals to an upstream mixer 345'. The mixer combines these upstream signals with local oscillator signals from the Comb generator 370 to shift the normal upstream ADSL spectra coming from each remote ADSL unit, consisting of the narrowband signalling channel and the embedded operations channel (EOC), to a different frequency band. Each spectrum is then input to the frequency combiner which frequency division multiplexes the shifted upstream signals from each subscriber's ADSL filter combiner/splitter unit into a combined spectrum for output to an upstream analog laser 325'. The upstream laser converts the electrical signal representing the combined spectrum to an optical signal and transmits that optical signal to the central office via an optical fiber. This upstream fiber could be a second fiber, separate from the fiber which carries the combined downstream spectrum of compressed, digitized video information or it could be the same fiber shared using optical diplexing techniques.

At the central office, the upstream optical fiber supplies the upstream optical signal to an optical receiver 335' which converts that signal to an electrical signal for input to a voltage splitter 340'. The splitter in turn supplies the electrical signal containing the combined spectra as an input for each upstream mixer 382 at the central office. Each mixer combines the upstream spectrum with a different local oscillator frequency from the Comb generator 380 so that each mixer outputs the transmission associated with one of the remote ADSL units at a restored center frequency $f_o$ corresponding to the upstream frequency spectra used in normal ADSL transmission. The mixer output is delivered to the ADSL muldem where the signal is demodulated and time division demultiplexed. The embedded operations channel (EOC) transmission is terminated and utilized internally in the ADSL muldem. The ADSL muldem outputs the signalling channel to the X.25 network 385 for transmission to the appropriate information provider equipment.

Figure 6:
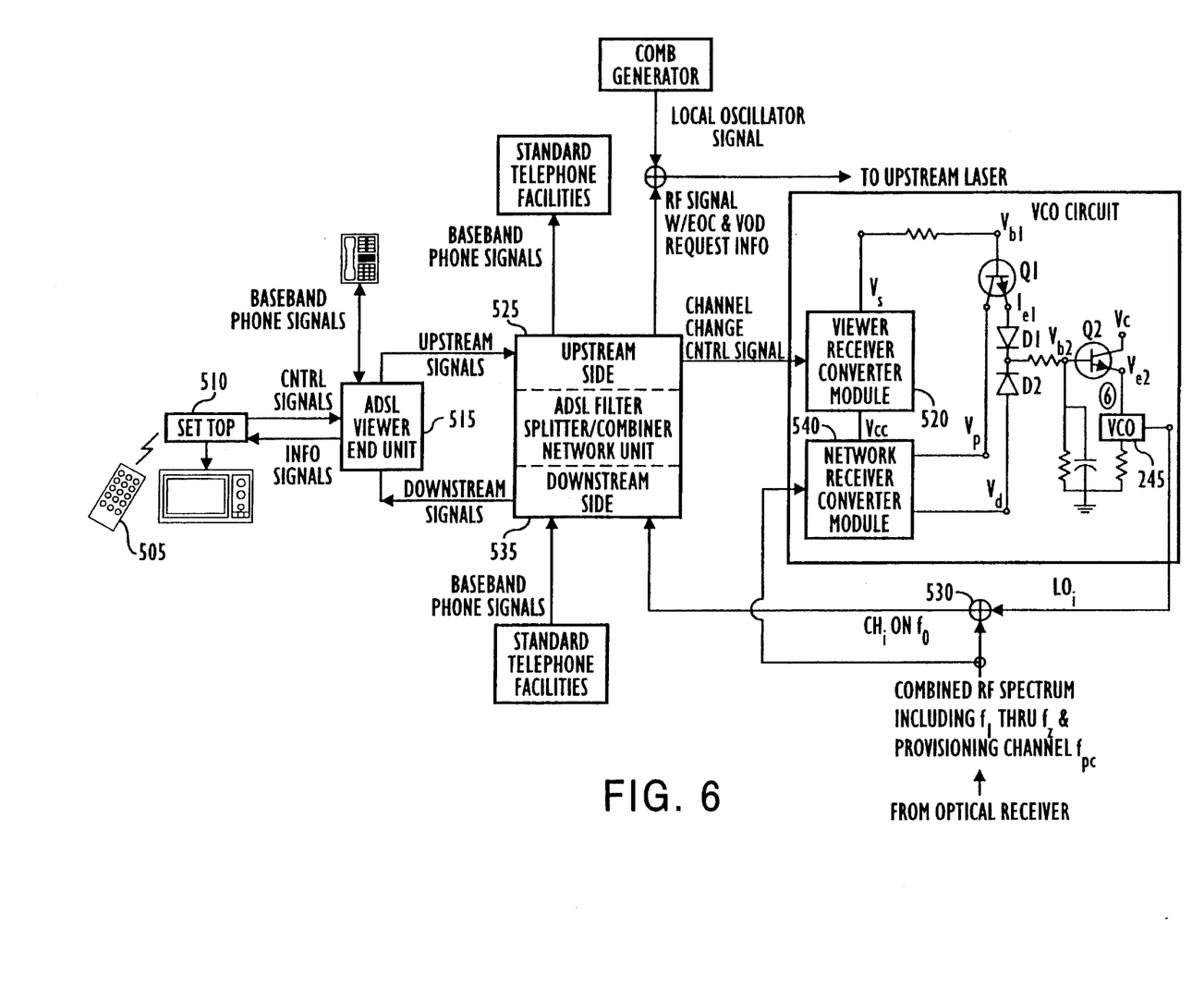
FIG. 6 illustrates details of channel selection and provisioning used in the network configuration of FIGS. 4 and 5.

FIG. 6 shows one specific technique for allowing a viewer to access CATV channels, if provisioned, and to selectively access a specific channel which contains on-demand programming that the subscriber requests. When the viewer actuates channel changes via his remote control 505, the set top unit 510 in union with the viewer ADSL unit 515 will output a characteristic signal corresponding to the channel selected. This signal could be a particular frequency, a frequency modulated, digitally modulated or other type signal that could be translated into a d.c. voltage at the viewer receiver converter 520. The upstream side of the network ADSL unit (filter/splitter) 525 would extract this signal from the combined upstream signals and deliver it to the viewer receiver converter module 520. This module will receive the signal and output a channel specific voltage ($V_s$). This voltage provides a bias voltage ($V_{b1}$) at the base input to transistor Q1. The resulting emitter current $I_{e1}$ is a function of $V_{b1}$ and in turn produces a bias voltage $V_{b2}$ at the base input to transistor Q2. The emitter voltage $V_{e2}$ input to the VCO 545 will track approximately with $V_{b2}$, changing the output local oscillator frequency $LO_i$. $LO_i$ is input to the mixer 530 along with the entire output spectrum (i.e. all channels) of the optical receiver. As the subscriber changes channels, $LO_i$ changes frequency, and different spectra (containing different channel programming) are shifted to $f_o$ for combination with the telephone signals in the downstream side of the network ADSL unit (filter/combiner) 535 and transmission to the viewer ADSL unit 515.

If the viewer has not subscribed to any CATV services a signal is sent over the provisioning channel to the Network Receiver Converter Module 540 to reset or unprovision CATV service. The signal sent contains the type of provisioning (CATV or On demand) the circuit location of the viewer's ADSL unit and the reset code. The result is that the provisioning voltage $V_p$ is set to zero on the port associated with the viewer. Since $V_p$ is the supply voltage for Q1, setting $V_p$ to zero, effectively turns off Q1 and eliminates viewer signals from reaching the VCO and tuning in a CATV channel.

If a viewer decides to subscribe to a CATV service then a set (i.e., provision CATV service) signal is sent resulting in $V_p$ being set to a level greater than the highest level that $V_s$ would reach when the viewer scans through channels, i.e. $V_z$ so that a reverse biased collector-base junction is maintained and Q1 stays turned on.

If the viewer requests an on-demand program, a vacant channel $f_i$ is selected from the subset $f_l$ through $f_n$ and assigned to that viewer. A signal is then sent over the provisioning channel to the Network Receiver Converter Module (9), to provision that particular channel to the requesting viewer. The signal set contains the type of provisioning (CATV or On demand) the circuit location of the viewer's ADSL unit and the code of the channel to be provisioned. The result is that the on-demand provisioning voltage $V_d$ is set, on the port associated with the requesting viewer, to some voltage $V_i$ with a value $V_l$ through $V_n$ that would allow the assigned channel $f_i$ to be extracted at the mixer.

In a standard application of this method, the requesting viewer would tune to channel 1 which results in an output voltage $V_s<0$. Therefore Q1 is turned off and the bias voltage $V_{b2}$ at the base of transistor Q2 is solely a function of $V_d$. Since the emitter voltage $V_{e2}$ input to the VCO 545 will track approximately with $V_{b2}$, $V_d$ controls the output local oscillator frequency LO. In this case $V_d=V_i$ gives $LO_i$ which is input to the mixer 530 along with the entire output spectrum (i.e., all channels) of the optical receiver. Inputting $LO_i$ results in $f_i$ being shifted to $f_o$ for combination with the telephone signals in the downstream side of the network ADSL unit (filter/combiner) 535 and transmission to the viewer ADSL unit 515.

If the requesting viewer is a CATV subscriber he or she can also scan channels while requested programming is being delivered, i.e., if the subscriber wishes to check other programs while an on demand movie is running he or she may do so. Changing to other channels (e.g. other than channel 1) results in voltage $V_s$ with a value from $V_{n+1}$ to $V_z$ being output from the viewer receiver converter. This results in a proportional voltage $V_{b1}$ at the base lead of Q1 and voltage $V_{e1}$ approximating at the emitter lead of Q1 and anode lead to D1. $V_{n+1}$ to $V_z$ are selected to be of sufficient voltage level so that $V_{e1}$ exceeds $V_d$ by more than the forward bias voltage of D1 and D2. This keeps D1 turned on and D2 off resulting in the bias voltage $V_{b2}$ being a function solely of $V_s$ and under control of the viewer's channel selection. Since $V_{e2}$ approximates $V_{b2}$ and controls the output LO frequency of the VCO the CATV channel selection process is accomplished as explained above even with the on-demand program in progress.

The preceding description of provisioning assumes all CATV channels are provisioned at once. Channel by channel provisioning is also possible. In such an implementation, an indication of which channels are authorized to a user is downloaded over the provisioning channel $f_{pc}$ to the Network Receiver Converter Module 540 which functions as authorization control means. The form of the download can be as simple as a binary string with one cell for each channel. The channel by channel provisioning information can be stored in Network Receiver Converter Module 540 on (1) the memory of a microprocessor, if the Network Receiver Converter Module is implemented with microprocessor control, (2) in a Programmable Logic Device, or (3) in Programmable Gate Arrays. The link $V_{cc}$ between Viewer Receiver Converter Module 520 and Network Receiver Converter Module 540 permits current channel information to be shared between the modules and permits the Network Receiver Converter Module 540 to send a channel authorization response signal to the Viewer Receiver Converter Module 520 indicating whether the current channel is provisioned for receipt by the user. The channel authorization response signal is utilized to permit or inhibit the application of tuning voltage $V_s$ to $V_{b1}$.

The VCO circuits described above are the preferred techniques for allowing provisioning of both VOD and CATV services to a subscriber utilizing ADSL and fiber technologies. Other circuits known to those trained in the art may also be employed.

For most installations the analog fiber facility will appear transparent adding virtually no distortion and very low level undesired signals or noise. This allows greatly increased transmission distances, bandwidth or decreased ADSL minimum specifications resulting in less expensive ADSL units. In either case, facilities which would otherwise be unacceptable for video transmission, such as copper pairs beyond 18,000 feet, can be economically bypassed.

Additionally, since several ADSL channels are simultaneously presented to a frequency selective down converter (i.e. mixer) assigned to each subscriber, at a remote distribution point, the video signal for certain channels may be shared. Other channels may be dynamically assigned to individual subscribers for viewing 'on-demand' programs (i.e. for VOD type services), reducing the required number of CO based ADSL units.

The above discussion of the best modes of practicing the invention are intended as examples only. The appended claims define the scope of patent protection.

I claim:

1. In a video distribution system in which video signals are distributed to end users over a telephone wiring plant of a central office using respective pairs of asymmetrical digital subscriber line (ADSL) interface units, a source side interface unit of each pair being located relatively closer to a source of video information than a subscriber side interface unit and the subscriber side interface unit of each pair being located at an end user's location, a method of improving operating characteristics of said distribution system comprising the steps of:

(a) locating the ADSL source side interface unit at a site remote from said central office, and (b) connecting the source of video information to the ADSL source side interface unit using a broadband communication link.

2. A method of adapting an existing telephone wiring plant of a central office used to provide telephone service to one or more subscribers over individual subscriber loops to accommodate distribution of video information, comprising:

(a) providing one or more sources of video information, (b) connecting said one or more sources of video information to a distribution point remote from a central office over a broadband communication link, and (c) at said remote distribution point, multiplexing video information from said one or more sources together with telephone information onto individual subscriber loops.

3. A method of distributing video information to one or more subscriber locations over individual subscriber loops, comprising:

(a) providing one or more sources of video information, (b) connecting said one or more sources of video information to a distribution point at a site which is remote from a central office and remote from subscriber locations over a broadband communication link, and (c) at said remote distribution point, providing a mechanism by which the subscriber selects one or more sources of video information to be provided to the subscriber's individual subscriber loop.

4. In a multichannel information distribution system in which only some channels are authorized for access by a subscriber and in which the subscriber controls selection of one or more particular channels to be provided to the subscriber, apparatus for channel selection comprising:

(a) a user operated channel selector for generating a user selection signal indicative of a particular channel or channel change desired by the user, (b) a converter for receiving said user selection signal and converting it into a specific channel selection signal, (c) a signal generator at said converter for selectively generating a provisioning signal indicating that a first group of one or more CATV or broadcast channels is authorized to be received by the subscriber, or for selectively generating a demand signal indicating that one or more special services is authorized to be received by the subscriber on one or more channels of an on-demand group or for selectively generating both a provisioning signal and a demand signal, and (d) output means for providing a specific channel of the first group indicated by the channel selection signal to the subscriber only if the provisioning signal is present and a specific channel of the on demand group indicated by the channel selection signal only if the demand signal is present.

5. The apparatus for channel selection of claim 4 in which said signal generator is selectively activated over a network.

6. The apparatus for channel selection of claim 4 in which said converter receives said user selection signal over a network.

7. The apparatus for channel selection of claim 4 in which the output means comprises means for controlling a variable frequency oscillator to select the specific channel to be provided to the subscriber.

8. A video distribution system constructed in accordance with the method of claim 1.

9. A telephone wiring plant adapted in accordance with the method of claim 2.

10. A video distribution system distributing video information in accordance with the method of claim 3.

11. A video distribution system comprising:

a source of plural channel video programming;

a first level multiplexer/demultiplexer circuit connected to respective channels of video programming for multiplexing video programming information into a multiplexed format and demultiplexing multiplexed formatted signals into base band signal component;

a plural video channel multiplexer for multiplexing the outputs of the first level multiplexer/demultiplexer circuits into a composite signal; broad band communication means for transmitting said composite signal to an intermediate distribution point; and distribution means at the intermediate distribution point associated with each subscriber for selecting a channel from the composite signal and for combining that channel with a plain old telephone signal for transmission to the associated subscriber.

12. A video distribution system in accordance with claim 11 in which the source of plural channel video programming is a video library.

13. A video distribution system in accordance with claim 11 in which the video programming is received over a network.

14. A video distribution system in accordance with claim 11 in which the video programming is received from a CATV head end.

15. A video distribution system in accordance with claim 11 in which the video programming is received over a satellite video feed.

16. A video distribution system in accordance with claim 11 in which the source of plural channel video programming is a live video feed.

17. A video distribution system in accordance with claim 11 wherein the plural video channel multiplexer comprises individual channel mixers connected to respective outputs of the first level multiplexer/demultiplexer circuits and connected to respective oscillator frequency outputs from a multiple frequency generator.

18. A video distribution system in accordance with claim 11 wherein the broad band communication means includes a laser and an optical fiber.

19. A video distribution system in accordance with claim 18 in which the laser is an analog laser.

20. A video distribution system in accordance with claim 11 wherein the broad band communication means includes a coaxial cable.

21. A video distribution system in accordance with claim 11 wherein the broad band communication means utilizes radio frequency transmission.

22. A video distribution system in accordance with claim 20 wherein the radio wave transmission is microwave.

23. A video distribution system in accordance with claim 11 wherein distribution means includes a voltage splitter for providing individual copies of a composite spectrum to individual subscriber lines.

24. A video distribution system in accordance with claim 11 wherein distribution means includes a frequency combiner for combining upstream information into a composite frequency division multiplexed upstream spectrum.

25. A video distribution system in accordance with claim 11 wherein distribution means includes a mixer for translating a desired programming channel of the composite spectrum into the passband of a subscriber filter.

26. A video distribution system in accordance with claim 25 wherein the mixer is driven by a voltage controlled variable frequency oscillator.

27. A video distribution system in accordance with claim 26 wherein the voltage controlled variable frequency oscillator is remotely controlled by the subscriber.

28. A video distribution system in accordance with claim 11 wherein the distribution means includes a first level combiner/splitter for combining a plain old telephone signal with the desired video programming channel.

29. A video distribution system in accordance with claim 28 wherein the first level combiner/splitter combines signals into an ADSL format.

30. A video distribution system in accordance with claim 11 wherein the first level multiplexer/demultiplexer is an ADSL multiplexer and the multiplexed format is in ADSL format.

31. A video distribution system in accordance with claim 11 wherein said distribution means combines a selected video channel with a telephone signal in an ADSL format.

32. A video distribution system in accordance with claim 11 wherein said distribution means includes:

means for receiving viewer control signals;

means for receiving supervisory control signals;

means for applying said viewer control signals to the base of a first transistor;

means for selectively applying a first supervisory control signal to one of the emitter or collector of the first transistor and for applying the output of the first transistor to the base of a second transistor;

means for selectively applying a second supervisory control signal to the base of said second transistor; and means for connecting the output of the second transistor to a voltage control oscillator.

33. A video distribution system in accordance with claim 32 wherein the first supervisory control signal is a signal indicating that CATV service is provisioned.

34. A video distribution system in accordance with claim 32 wherein the second supervisory control signal indicates the video on demand is being provided.

35. A video distribution system in accordance with claim 32 wherein the viewer control signals are channel change signals.

36. A video distribution system in accordance with claim 31 wherein the viewer control signals are channel select signals.

37. In a multichannel information distribution system in which only some channels are authorized for access by a subscriber and in which the subscriber controls selection of one or more particular channels to be provided to the subscriber, apparatus for channel selection comprising:

(a) a user operated channel selector for generating a user selection signal indicative of a particular channel or channel change desired by the user, (b) a converter for receiving said user selection signal and converting it into a specific channel selection signal, (c) authorization control means for receiving channel specific provisioning information and storing it and for selectively generating (1) a provisioning signal, indicating that a first group of one or more channels is authorized to be received by the subscriber (2) a demand signal, indicating that one or more special services is authorized to be received by the subscriber on one or more channels of an on-demand group or (3) both a provisioning signal and a demand signal, and for generating (4) a channel specific authorization signal indicating for each channel whether that channel is authorized to be received by that user (d) output means for providing a specific channel of the first group indicated by the channel selection signal to the subscriber only if the provisioning signal is present and the channel specific authorization signal indicates the channel is authorized and for providing a specific channel of the on-demand group indicated by the channel selection signal only if the demand signal is present.

38. Apparatus for channel selection as claimed in claim 37, in which the authorization control means comprises a programmable logic device.

39. Apparatus for channel selection as claimed in claim 37, in which the authorization control means comprises a programmable gate array.

40. Apparatus for channel selection as claimed in claim 37, in which the authorization control means comprises a microprocessor.

* * * * *